3785X
J. OSBORN.
Straw Cutter.
Patented Dec. 6, 1823.
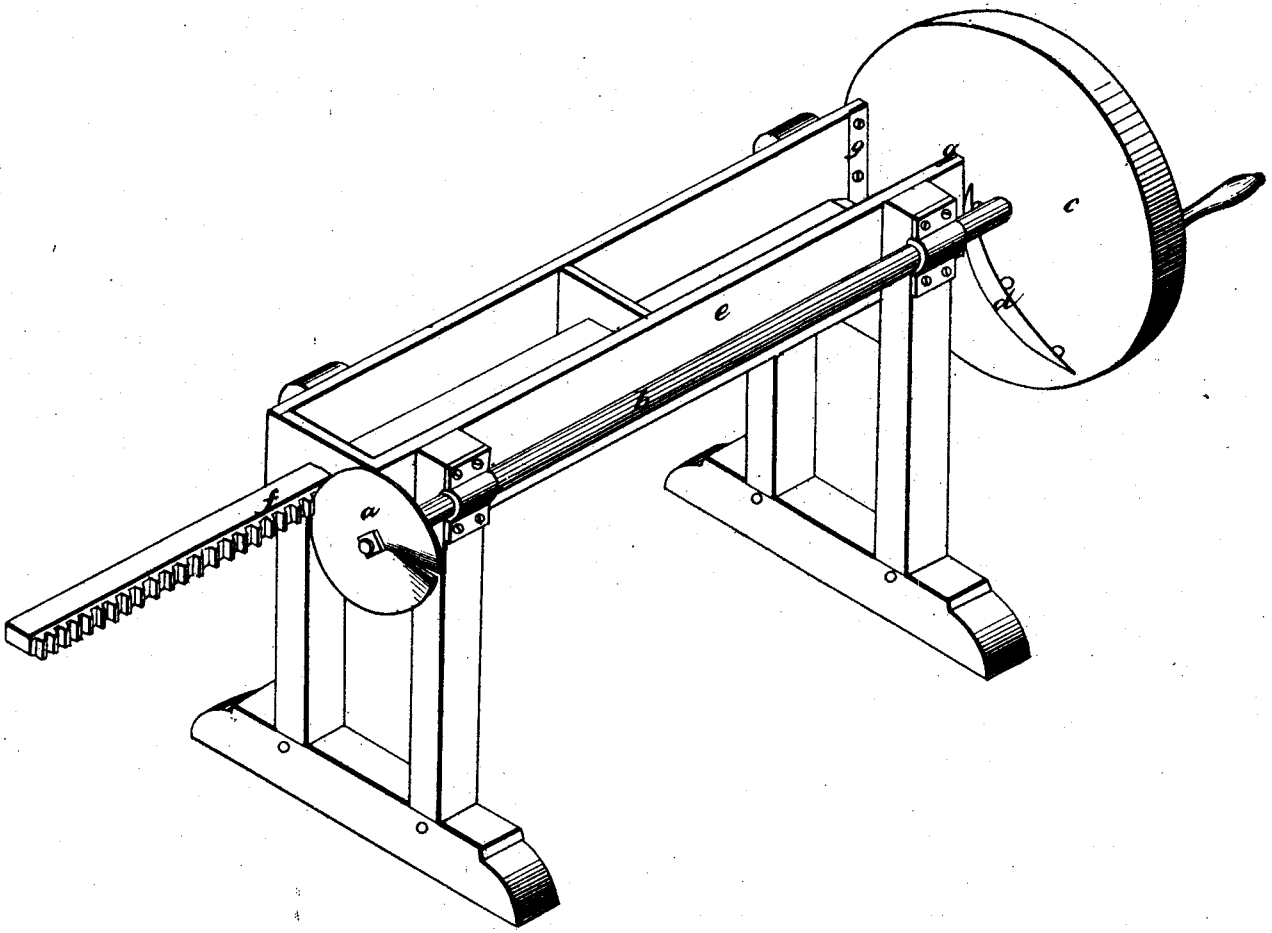
THE NORRIS PETERS CO., PHOTO-LITHO., WASHINGTON, D. C.

MISSING PAGE TEMPORARY NOTICE

PATENT # 3785X FOR ISSUE DATE 12-6-1823

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text